Patented June 26, 1928.

1,674,711

UNITED STATES PATENT OFFICE.

FREDERIC LEHNHOFF WYLD, OF PARIS, FRANCE.

PROCESS FOR THE MANUFACTURE OF METAL SALTS OF SULPHO-ARSENOL.

No Drawing. Original application filed May 28, 1924, Serial No. 716,482. Divided and this application filed November 9, 1925. Serial No. 68,011.

The present application is a division of my application No. 716,482 filed May 28th, 1924.

It is known that by reacting arsphenamine or neoarsphenamine (3, 3'-diamino-4, 4' dihydroxyarsenobenzene or sodium 3, 3'-diamino-4, 4'-dihydroxyarsenobenene-N-methylene sulphonate), with a metallic salt of suitable electropolarity, complex arsenometallic compounds are obtained, which are more active than arsphenamine or neoarsphenamine.

But the bodies thus obtained present various disadvantages, among which are the following: they are not very stable, they are easily oxidizable and their toxicity is largely increased. Moreover, when they are used as medicines, they can only be employed for intra-venous use and not for sub-cutaneous use.

The present invention has for its object to obtain organo-metallic products containing arsenobenzene as the main ingredient but which do not possess these drawbacks (particularly to obtain products which are much less toxic than those derived from arsphenamine and neoarsphenamine, and capable to be applied under the skin).

For that purpose it consists substantially in combining a soluble metallic salt with arsphenamine base after the transformation of the latter into sulpho-arsenol (3, 3'-diamino-4, 4'-dihydroxyarsenobenzene-N-methylene sulphonate of sodium). The resulting substance represents a complex metallic compound of sulpharsenol, with the metal attached to the arseno group.

The invention comprises reacting the soluble salt of the desired metal with sulpho-arsenol itself.

A complex organo-metallic derivative of sulpho-arsenol is obtained, presenting the following main advantages:

1. It is not caustic, it is perfectly neutral and does not injure the living tissues.

2. Its toxicity is much reduced and is from 4 to 10 times less than that of the original products.

3. It does not readily oxidize. Solutions of it therefore do not rapidly become toxic when exposed to air.

The example hereinafter set forth will give a clear understanding of the process.

*Example.*—The zinc sulphoarsenol is obtained by dissolving one to two molecular weights of bichloride of zinc or other salt of zinc soluble in methyl alcohol or fractions of molecular weights if it is desired to prepare products containing less zinc, in 10 parts of alcohol, and, on the other hand, a molecular weight of sulpho-arsenol in 2 parts of water.

The alcohol solution is slowly poured into the solution of sulpho-arsenol while cooling; the precipitation of the salt sets in at once. Normal alcoholic caustic soda is added, until nearly neutral, and the whole is left to settle 24 hours, then filtered and washed with pure alcohol from impurities (chloride of sodium, hydrochloric acid, free sulphurous acid).

The product is a complex metallic compound in which the zinc attaches itself to the arseno-group the alkaline "salt", that is the "methylsulphonate of sodium" remains untouched.

The product obtained is in the form of a light yellow powder soluble in water in any proportions, giving a very light yellow solution, insoluble in the usual organic mediums. Ammonia and the alkaline reagents darken the colour of the solution without releasing the zinc.

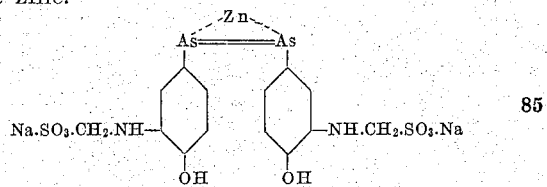

Instead of zinc, it is possible to obtain in the same way the corresponding metallic compounds of magnesium, cadmium, copper, silver, etc. These products have not been heretofore obtained and the utilization of chlorides (and other soluble salts of these metals) are essential points of the invention.

It is to be understood that all the details for carrying out the process can be varied in all cases without departing from the principle of the invention.

Claims:—

1. A process for the manufacture of complex metal compounds of sulpharsenol which comprises combining a soluble metallic salt with sulpharsenol.

2. A process for the manufacture of organo-metallic combinations of sulpharsenol which comprises combining soluble metallic chlorides with sulpharsenol.

3. The process for the manufacture of complex zinc compound salts of sulpharsenol which comprises treating sulpharsenol with zinc chloride.

4. A process for the manufacture of zinc complex compounds of sulpharsenol which comprises treating a solution of a zinc salt with sulpharsenol.

5. A zinc compound of sulpharsenol with the probable formula

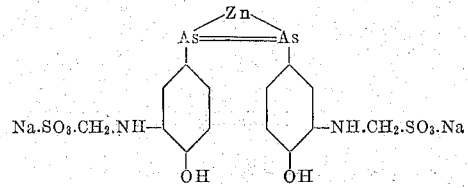

Signed by me this 30th day of October, 1925.

FREDERIC LEHNHOFF WYLD.